US012516788B2

(12) United States Patent
Vissenberg et al.

(10) Patent No.: US 12,516,788 B2
(45) Date of Patent: Jan. 6, 2026

(54) TILE LIGHT LUMINAIRE FOR A SUSPENDED TILE LIGHT CEILING ASSEMBLY, AS WELL AS SUCH SUSPENDED TILE LIGHT CEILING ASSEMBLY

(71) Applicant: SIGNIFY HOLDING B.V., Eindhoven (NL)

(72) Inventors: Michel Cornelis Josephus Marie Vissenberg, Roermond (NL); Oliver Francis Burke, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/718,846

(22) PCT Filed: Dec. 9, 2022

(86) PCT No.: PCT/EP2022/085180
§ 371 (c)(1),
(2) Date: Jun. 12, 2024

(87) PCT Pub. No.: WO2023/110670
PCT Pub. Date: Jun. 22, 2023

(65) Prior Publication Data

US 2024/0410538 A1 Dec. 12, 2024

(30) Foreign Application Priority Data

Dec. 13, 2021 (EP) .................................... 21213942

(51) Int. Cl.
*F21S 8/00* (2006.01)
*E04B 9/00* (2006.01)
(Continued)

(52) U.S. Cl.
CPC .............. *F21S 8/026* (2013.01); *E04B 9/006* (2013.01); *E04B 9/0435* (2013.01); *F21V 21/048* (2013.01)

(58) Field of Classification Search
CPC ....... F21V 21/048; E04B 9/006; E04B 9/0435
See application file for complete search history.

(56) References Cited

U.S. PATENT DOCUMENTS 10,955,124 B2 3/2021 Carney et al.
2002/0100248 A1* 8/2002 D'agata .................... E04B 9/30 52/763
(Continued)

FOREIGN PATENT DOCUMENTS

CN 204345447 U 5/2015
CN 209605046 U 11/2019
(Continued)

*Primary Examiner* — Gerald J Sufleta, II

(57) ABSTRACT

According to a first example of the disclosure, a tile light luminaire (120) is proposed, which suitable for laying in the T-bar grid (11) of a suspended ceiling assembly (10), the tile light luminaire (120) having a luminaire housing (220) with an outer housing periphery (120*z*) being smaller than the inner periphery (10*z*) of a T-bar grid cell, and wherein a first periphery section (120*z*1) of the housing periphery (120*z*) of the tile light luminaire is structured for abutment with a section part of the periphery of the T-bar grid cell, and a second periphery section (120*z*2) of the housing periphery (120*z*) of the tile light luminaire is structured for abutment with a section part (130*z*2) of the periphery of a ceiling tile (130). As the tile light luminaire (120) has an outer periphery dimension (120*z*), which is smaller than the inner periphery dimension (10*z*) of a T-bar grid cell of a suspended ceiling assembly (10), such tile light luminaire is suitable to be interchanged between T-bar grids having different dimensions, either square or rectangular.

13 Claims, 20 Drawing Sheets

(51) Int. Cl.

| | |
|---|---|
| ***E04B 9/04*** | (2006.01) |
| ***F21S 8/02*** | (2006.01) |
| ***F21V 21/04*** | (2006.01) |

(56) References Cited

U.S. PATENT DOCUMENTS

| | | | | |
|---|---|---|---|---|
| 2016/0116118 | A1 | 4/2016 | Bernard et al. | |
| 2016/0178146 | A1 * | 6/2016 | Oleske | F21V 21/04 52/28 |
| 2017/0082252 | A1 | 3/2017 | Casement et al. | |
| 2019/0132928 | A1 | 5/2019 | Rodinger et al. | |
| 2019/0203465 | A1 * | 7/2019 | Evans | F21V 7/0008 |
| 2020/0354513 | A1 * | 11/2020 | Niemiec | F21V 29/67 |
| 2021/0148529 | A1 * | 5/2021 | Nijkamp | G02B 6/005 |
| 2022/0243747 | A1 * | 8/2022 | Schluter | A47B 47/0016 |

FOREIGN PATENT DOCUMENTS

| | | | |
|---|---|---|---|
| EP | 3002512 | B1 | 9/2018 |
| FR | 2737551 | A1 | 2/1997 |
| WO | 2013153534 | A1 | 10/2013 |
| WO | 2016100655 | A3 | 8/2016 |

* cited by examiner

TILE LIGHT LUMINAIRE FOR A SUSPENDED TILE LIGHT CEILING ASSEMBLY, AS WELL AS SUCH SUSPENDED TILE LIGHT CEILING ASSEMBLY

CROSS-REFERENCE TO PRIOR APPLICATIONS

This application is the U.S. National Phase application under 35 U.S.C. § 371 of International Application No. PCT/EP2022/085180, filed on Dec. 9, 2022, which claims the benefit of European Patent Application No. 21213942.2, filed on Dec. 13, 2021. These applications are hereby incorporated by reference herein.

TECHNICAL FIELD

The present disclosure relates to a tile light luminaire suitable for laying in the T-bar grid of a suspended tile light ceiling assembly. The disclosure also pertains to a suspended tile light ceiling assembly implementing a T-bar grid and such tile light luminaire.

BACKGROUND OF THE INVENTION

Indoor lighting applications in office spaces, supermarkets or other large area spaces are often based on in a suspended tile light ceiling assembly implementing a T-bar grid and tile light luminaires, which are laid or mounted in a grid cell of the T-bar grid. Such suspended tile light ceiling assemblies are mounted at some distance from the ceiling in a suspended manner, and accordingly hides the building infrastructure, such as cables, air-conditioning piping, heating and water piping, etc. In addition to the tile light luminaires, which provide the lighting functionality, the remainder of the suspended T-grid is occupied by ceiling tiles, often manufactured from compacted mineral fibers. Such material can be non-flammable. Additionally, such fiber ceiling tiles provide, next to an improved visual appearance and flame resistance, also sound proofing by the damping of sound and thus improve the acoustics in the office space or room.

Such suspended tile ceiling assemblies implementing a T-bar grid are available in standardized dimensions, which dimensions however might differ in different countries. A common size of a grid cell surface area is 600 mm×600 mm, however other grid cell dimensions are used, such as 625 mm×625 mm and 675 mm×675 mm. Next to the so-called square T-grid dimensions, also suspended ceiling assemblies implementing a rectangular T-bar grid dimension are commercially available.

For each type of suspended tile light ceiling assembly implementing a square or rectangular T-bar grid of a certain dimension, tile light luminaires and mineral fibre ceiling tiles are used, having more or less corresponding dimensions, thus filling the whole surface area of a T-bar grid cell. This situation limits a more versatile and flexible use of the T-bar grid as to its illumination ceiling area and also limits use of other types and sizes of tile light luminaries.

Accordingly, it is a goal of the present disclosure to provide an improved light, which is interchangeable between suspended ceiling assemblies implementing T-bar grids of a different dimension and allow an adaptive lighting visual with a large variety of lighting patterns across the suspended ceiling surface.

US2019/0203465A1 discloses a ceiling tile with integrated lighting and ceiling system.

SUMMARY OF THE INVENTION

According to a first example of the disclosure, a combination of at least a tile light luminaire and a ceiling tile is proposed, said combination being configured for laying/being mounted into a T-bar grid cell of a T-bar grid of a suspended ceiling assembly available in standard dimensions,

- wherein the tile light luminaire has a luminaire housing with an outer housing periphery being smaller than the inner periphery of the T-bar grid cell, wherein a first periphery section of the housing periphery of the tile light luminaire is structured for abutment with a section part of the periphery of the T-bar grid cell, and a second periphery section of the housing periphery of the tile light luminaire is structured for abutment with a section part of the periphery of a ceiling tile,
- wherein the periphery of the ceiling tile having a section part being complementary to a section part of the periphery of a tile light luminaire,
- wherein the tile light luminaire has a tile light surface and the ceiling tile has a ceiling tile surface, in mounted configuration of said combination a cell surface area of the T-bar grid cell is essentially completely covered by said combination,
- wherein the second periphery section is provided with a support rail structured to support the section part of the periphery of a ceiling tile, and
- wherein the support rail is provided with mounting pins for interaction with the section part of the periphery of a ceiling tile.

As the tile light luminaire has an outer periphery dimension, which is smaller than the inner periphery dimension of a T-bar grid cell of a suspended ceiling assembly, such tile light luminaire is suitable to be interchanged between T-bar grids having different dimensions, either square or rectangular. As the housing periphery of the tile light luminaire is capable of interacting through abutment with both the inner periphery of the T-bar grid by means of a first periphery section of the housing periphery of the tile light luminaire and the outer periphery of a ceiling tile by means of a second periphery section of the housing periphery of the tile light luminaire, various lighting patterns can be established across the suspended ceiling surface. Typically, the surface area of the grid cell is essentially completely, i.e. for at least 90%, such as 95% up to and including 100%, covered by at least one tile light luminaire and at least one (complementary) ceiling tile.

For an effective abutment with the inner periphery of the T-bar grid cell, the first periphery section comprises at least one straight periphery part and more preferably comprises at least two straight periphery parts. In addition, in an example of a tile light luminaire having a specific geometry, the first periphery section comprises at least one supporting point.

Furthermore, in an specific example of the disclosure, also the second periphery section comprises at least one straight periphery part. The second periphery section may also comprises at least one curved periphery part, which curved periphery section can be a circle arc or elliptical periphery section. This allows for the creation of lighting ceiling surfaces having a variety of curved patterns.

In a particular example, the at least one circle arc periphery section is a 90° or 180° circle arc.

In particular, for both the first and second periphery sections, the at least two straight periphery parts of that periphery section may have an inclined orientation with respect to each other. Preferably, the inclination is 90° or smaller, in particular 30°, 45°, 60° or 90°. Tile light luminaries having such specific outer periphery designs of their luminaire housing, can be used complex and appealing lighting pattern designs, which deviate significantly from the known straight-forward square or rectangular designs.

In an advantageous example, the second periphery section is provided with a support rail structured to support the section part of the periphery of a ceiling tile, preferably such that tile light surface and the ceiling tile surface are mutually flush. In particular, the support rail is provided with mounting pins for interaction with the section part of the periphery of a ceiling tile, and/or the support rail is provided with venting openings. In addition, the support rail may be provided with one or more mounting openings, e.g. for mounting or accommodating one or more sensor elements.

In a further example of the disclosure, the tile light luminaire further comprising at least one light emitting source within the luminaire housing and structured to emit light and wherein the luminaire housing is provided with a light exit window for the light being emitted, wherein the light exit window is provided with window parts, which are opaque to the light being emitted. Herewith an additional design feature is created, which allows for designing other lighting patterns across the suspended ceiling surface with a sophisticated surface illumination.

The disclosure also pertains to a suspended tile light ceiling assembly implementing a T-bar grid and a plurality of tile light luminaires suitable for laying in the T-bar grid as outlined in this specification.

In particular, the suspended tile light ceiling assembly comprises at least one ceiling tile suitable for laying in the T-bar grid, the periphery of the ceiling tile having a section part being complementary to a section part of the periphery of a tile light luminaire. Accordingly, such set of a tile light luminaire and ceiling tile having complementary periphery sections effectively occupy jointly the whole surface area of a T-bar grid cell and subsequently can be used to design complex and appealing lighting pattern.

In a further beneficial example, the plurality of tile light luminaires is composed of a first group of tile light luminaires configured to emit light having a first dominant peak wavelength and at least one further group of tile light luminaires configured to emit light having a further dominant peak wavelength, the further dominant peak wavelength being different from the first dominant peak wavelength.

With this example, the light emitted by the tile light luminaires of the different groups can have different properties. In particular, the emitted light spectrum can differ per tile light luminaire using in the suspended tile light ceiling assembly. A first tile light luminaire or a first group of tile light luminaire can emit a spectrum that provides functional light, such as visible light optimized for office work, whereas a further tile light luminaire or a further group of tile light luminaires emits light having a biological effect (such as a melanopic effect or for disinfection using UV light). In another example, one group of luminaires may emit functional white light, whereas another group can emit a lower intensity colored light pattern for a decorative purpose.

Accordingly, in one example outlined above both first and further dominant peak wavelengths are within the visible light wavelength range, whereas in the other example outlined above the first dominant peak wavelength is within the visible light wavelength range and the further dominant peak wavelength is within the invisible light (e.g. UV light) wavelength range.

In a further advantageous example of the disclosure, the first and further group of tile light luminaires emit light in different angular directions relative to the orientation of the ceiling. For example, the first tile light luminaire or the first group of tile light luminaire can emit a spectrum that provides functional light, such as visible light optimized for office work, can directed predominantly downwards, whereas the further tile light luminaire or the further group of tile light luminaires emits light providing a biological or aesthetical effect directed predominantly at angles deviating substantially from a normal to the ceiling.

BRIEF DESCRIPTION OF THE DRAWINGS

The invention will now be discussed with reference to the drawings, which show in.

DETAILED DESCRIPTION OF THE INVENTION

Figure 1A:
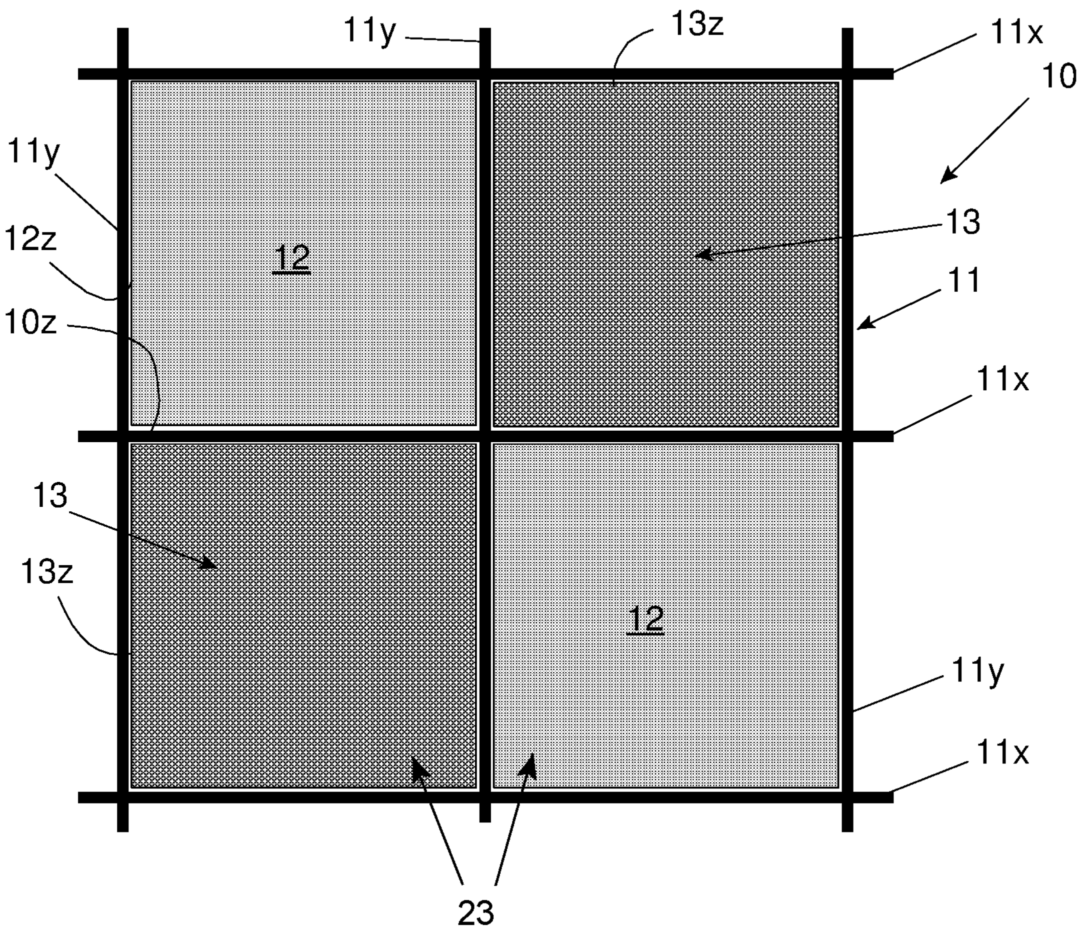
FIGS. 1*a* and 1*b* a first and second example of a suspended ceiling assembly implementing a T-bar grid and tile light luminaires according to the state of the art.

For a proper understanding of the invention, in the detailed description below corresponding elements or parts of the invention will be denoted with identical reference numerals in the drawings.

Figure 1B:
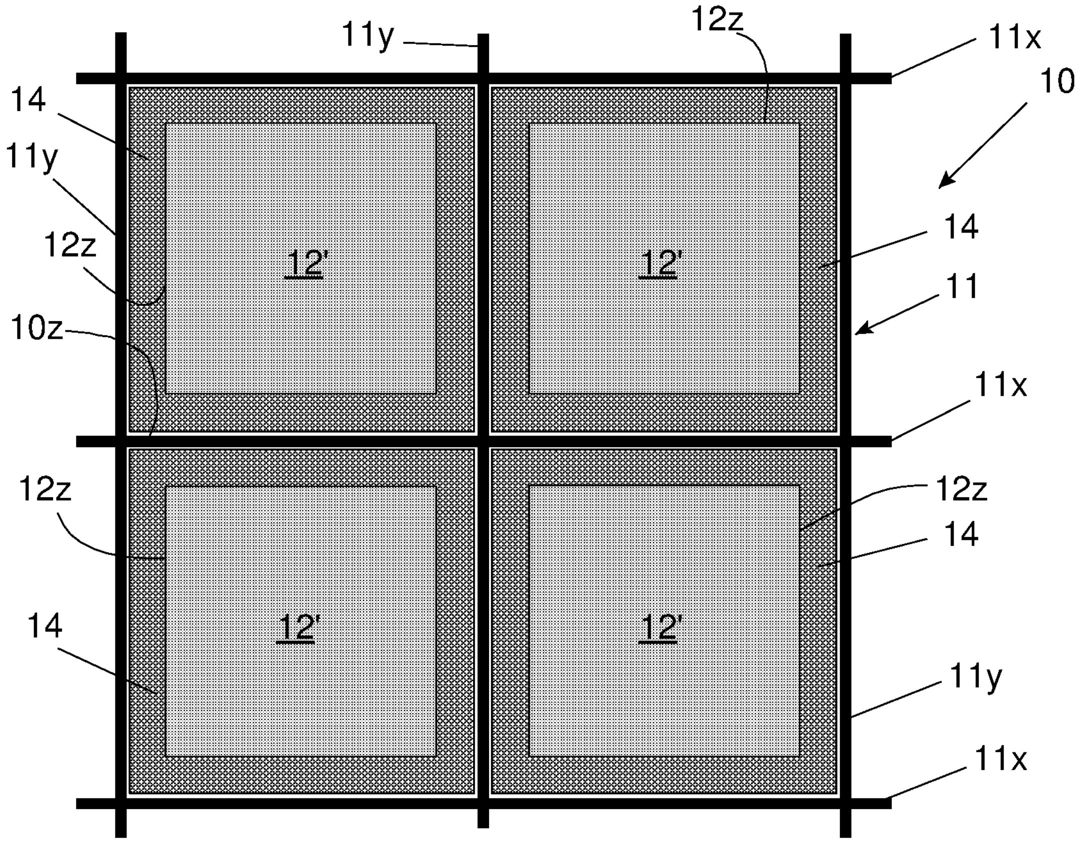

FIGS. 1*a* and 1*b* depict a first and second example respectively of a suspended ceiling assembly implementing a T-bar grid and tile light luminaires according to the state of the art.

Suspended ceiling assemblies (denoted with reference numeral 10) are often used for indoor lighting applications in office spaces, supermarkets or other large area spaces. Such suspended ceiling assemblies is mounted at some distance from the ceiling in a suspended manner, and accordingly hides the building infrastructure, such as cables, air-conditioning piping, heating and water piping, etc. In addition to the tile light luminaires 12, which provide the lighting functionality, the remainder of the suspended T-grid can be occupied by mineral fibre ceiling tiles (not shown in FIGS. 1*a* and 1*b*), which next to an improved visual appearance, also provide the damping of sound and thus improve the acoustics in the office space or room. Such material is often also non-flammable, thus providing some flame resistance.

Suspended ceiling assemblies implement a cartesian T-bar grid denoted with reference numeral 11, which grid is composed of grid bars 11*x* and 11*y* forming a cluster of (T-bar) grid cells 23. The grid bars 11*x* and 11*y* have a T-shape, and a tile light luminaire 12 can be mounted or laid in the grid cell, whereby the whole outer periphery 12*z* of tile light luminaire 12 is supported by the inner periphery 10*z* of each grid cell/T-bars 11*x* and 11*y*.

Such suspended ceiling assemblies 10 implementing a T-bar grid 11 are available in standardized dimensions, which dimensions however might differ in different countries. A common size of a grid cell surface area is 600 mm×600 mm, however other grid cell dimensions are used, such as 625 mm×625 mm and 675 mm×675 mm. Next to the so-called square T-grid dimensions, also suspended ceiling assemblies 10 implementing a rectangular T-bar grid dimension are commercially available.

For each type of suspended ceiling assembly implementing a square or rectangular T-bar grid of a certain dimension, tile light luminaires 12 and mineral fibre ceiling tiles 13 are used, having more or less corresponding outer dimensions or peripheries 12*z* and 13*z* respectively, thus filling the whole surface area of a T-bar grid cell. Examples of tile light luminaires 12 and mineral fibre ceiling tiles 13 occupying the whole area of a T-bar grid cell are shown in FIG. 1*a*.

There are configurations, as shown in FIG. 1*b*, wherein the tile light luminaire 12' has a luminaire housing with an outer periphery dimension, which is significantly smaller that the inner periphery dimension 10*z* of the T-bar grid cell. Accordingly, additional wide frame rim members or end pieces 14 are used, which are placed around the tile luminaire 12' in order to fill the gap and to properly cover the whole surface area of the T-bar grid cell.

However, both applications as shown in FIGS. 1*a* and 1*b* limit a more versatile and flexible use of the T-bar grid 11 as to its illumination ceiling area and also limits use of other types and sizes of tile light luminaries.

Figure 2:
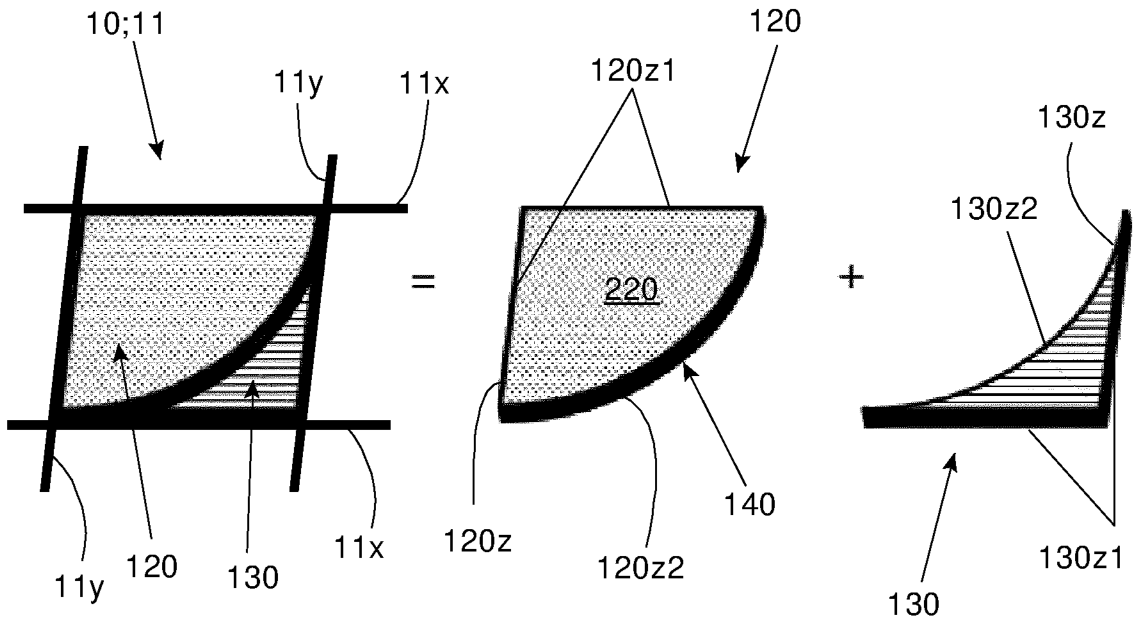
FIG. 2 an example outlining the principle of the disclosure.

FIG. 2 depicts the principle of the disclosure. It shows schematically and not to scale an example of a suspended ceiling assembly 10 implementing a T-bar grid 11 composed of intersecting T-bars 11*x*-11*y* and a tile light luminaire 120 according to the disclosure. In particular, a tile light luminaire (denoted with reference numeral 120) is proposed, which luminaire 120 is suitable for laying in the T-bar grid 11 of a suspended ceiling assembly 10. As depicted in more detail in FIGS. 4*a* and 4*b*, the tile light luminaire 120 according to the disclosure has a luminaire housing 220. The outer periphery 120*z* of the tile light luminaire 120/luminaire housing 220 is smaller than the inner periphery 10*z* of a T-bar grid cell formed by intersecting T-bars 11*x* and 11*y*, as depicted in FIG. 2.

It should be understood that in this disclosure the outer periphery 120*z* of the tile light luminaire 120 and the inner periphery 10*z* of a T-bar grid cell are considered as the circumference of both elements extending within the plane formed by the T-bar grid 11 of the suspended ceiling assembly 10.

In particular, and as shown in FIG. 2 (and in the several non-limiting examples depicted in FIGS. 3*a*-3*h* and 6*a*-6*b*), the outer periphery (or circumference) 120*z* of the luminaire housing 220 of the tile light luminaire 120 can be identified by a first periphery section (in all Figures denoted with 120*z*1) and a second periphery section (in all Figures denoted with 120*z*2). Combined, the length dimensions of both first periphery section 120*z*1 and second periphery section 120*z*2 make up for the overall length dimension of the outer periphery 120*z* of the luminaire housing 220 of the tile light luminaire 120.

According to the disclosure, the first periphery section 120*z*1 is structured for mounting abutment with the periphery 10*z* of the T-bar grid module or cell. Furthermore, the second periphery section 120*z*2 of the housing periphery 120*z* of the tile light luminaire 120 is structured for mounting abutment with a section part 130*z*2 of the periphery 130*z* of a ceiling tile 130.

As shown in FIG. 2, the tile luminaire 120 and the ceiling tile 130 have complementary periphery configurations. Accordingly, when combined together as mentioned before, both the tile luminaire 120 and the ceiling tile 130 occupy the whole surface area of the T-bar grid cell.

As the tile light luminaire 120 has an outer periphery dimension 120*z*, which is smaller than the inner periphery dimension 10*z* of a T-bar grid cell of a suspended ceiling assembly 10, such tile light luminaire 120 can be exchanged between T-bar grids having different dimensions, either square or rectangular. As the housing periphery 120*z* of the tile light luminaire 120 is capable of interacting through abutment with both the inner periphery 10*z* of the T-bar grid by means of its first periphery section 120*z*1 as well as with the outer periphery 130*z* of a ceiling tile 130 by means of its second periphery section 120*z*2 of the housing periphery 120*z*, various lighting patterns can be established across the suspended ceiling surface. Likewise, the ceiling tile 130 has a complementary first periphery sections 130*z*1 for abutment with the inner periphery 10*z* of the T-bar grid cell.

Various non-limiting examples of such various lighting patterns are depicted in the examples shown in FIGS. 3*a*-3*h*.

For an effective abutment with the inner periphery 10*z* of the T-bar grid module/cell 23, the first periphery section 120*z*1 has at least one straight periphery part and more preferably comprises at least two straight periphery parts. See FIGS. 3*a*, 3*b*, as well as FIGS. 3*e* and 3*f*. As shown in the FIGS. 3*a*-3*h* the surface area of the grid cells 23 are essentially completely covered by at least one tile light luminaire 120,220 and at least one (complementary) ceiling tile 130.

In the examples of FIGS. 3*a*-3*b*-3*c* and 3*d* two straight periphery parts of the first periphery section 120*z*1 of the tile light luminaire 120 have an inclined orientation with respect to each other, in the Figures mentioned is the inclination is 90°. Accordingly, the tile light luminaire 120 can be effectively positioned in one of the corners of the T-bar grid cell with a minimum of space between the luminaire housing and the T-bar grid. Herewith an optimal light emitting ceiling surface can be created using multiple tile light luminaries 120 in adjoining T-bar grid cells, as shown in FIGS. 3*a*-3*d*.

Figure 3A:
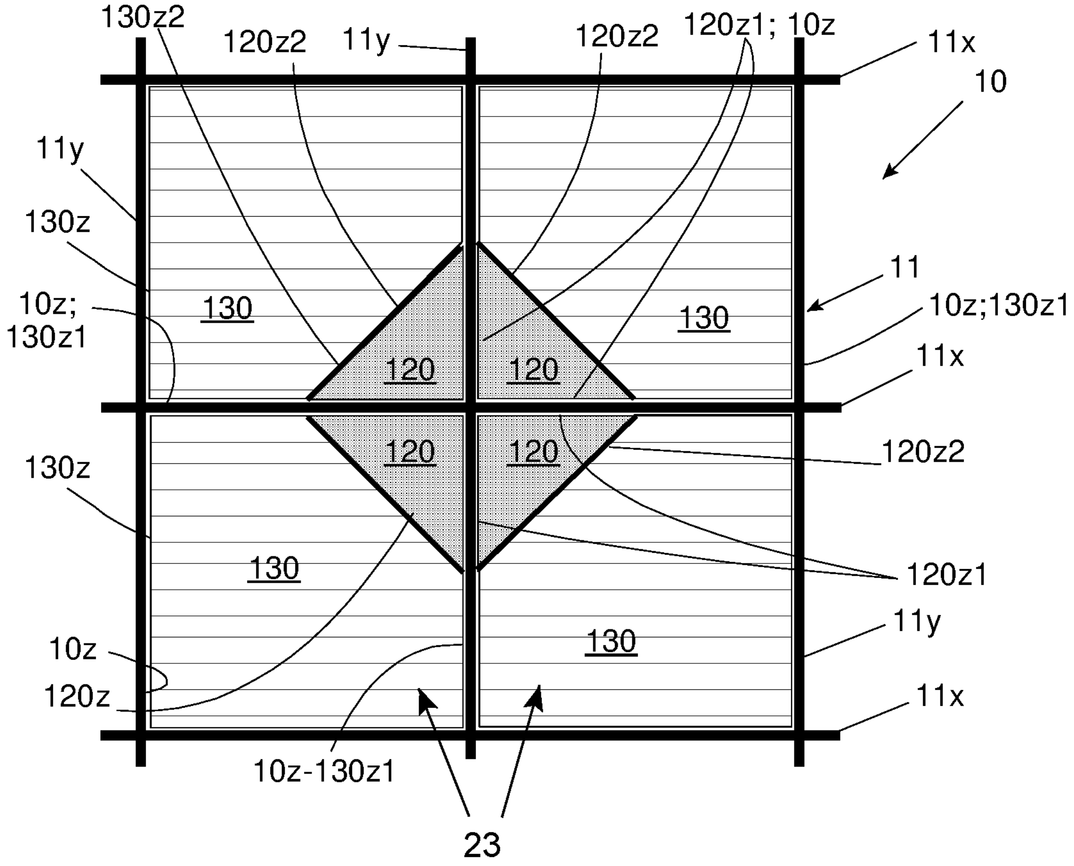
FIGS. 3*a*-3*h* non-limiting examples of embodiments of a suspended ceiling assembly implementing a T-bar grid and tile light luminaires according to the disclosure.
Figure 3B:
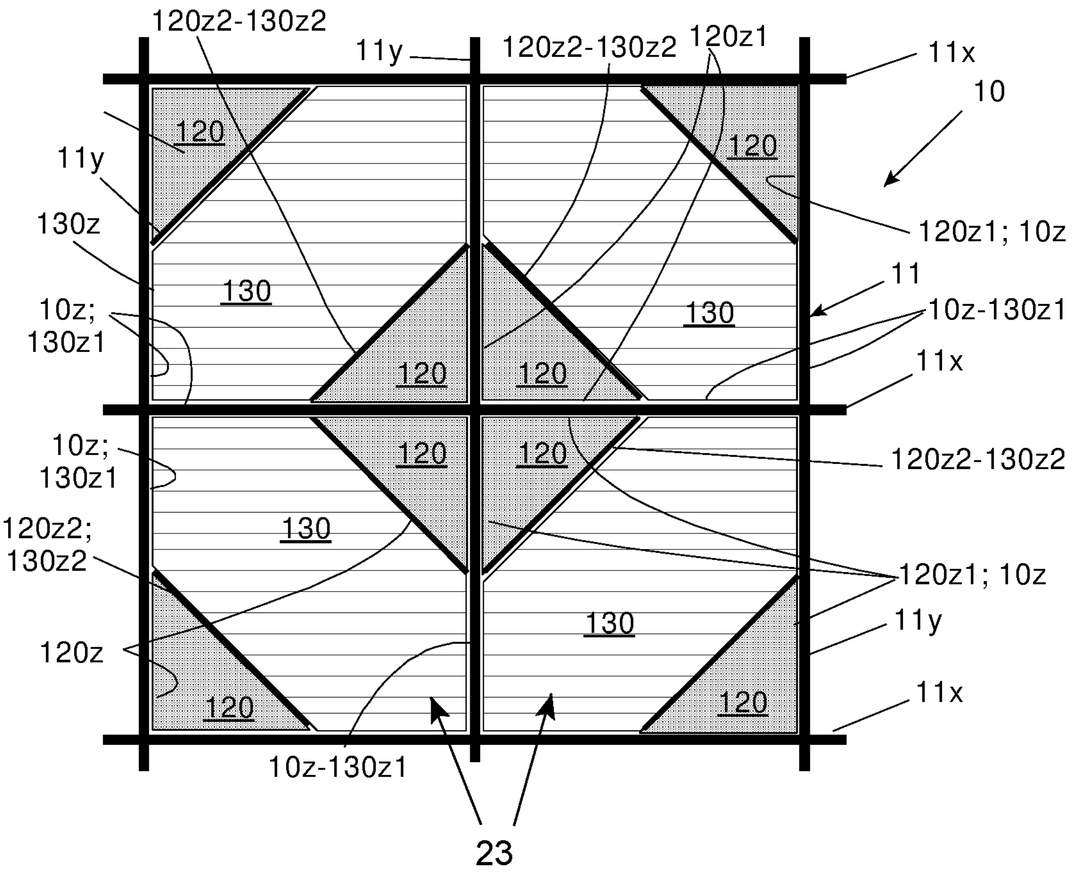
Figure 3C:
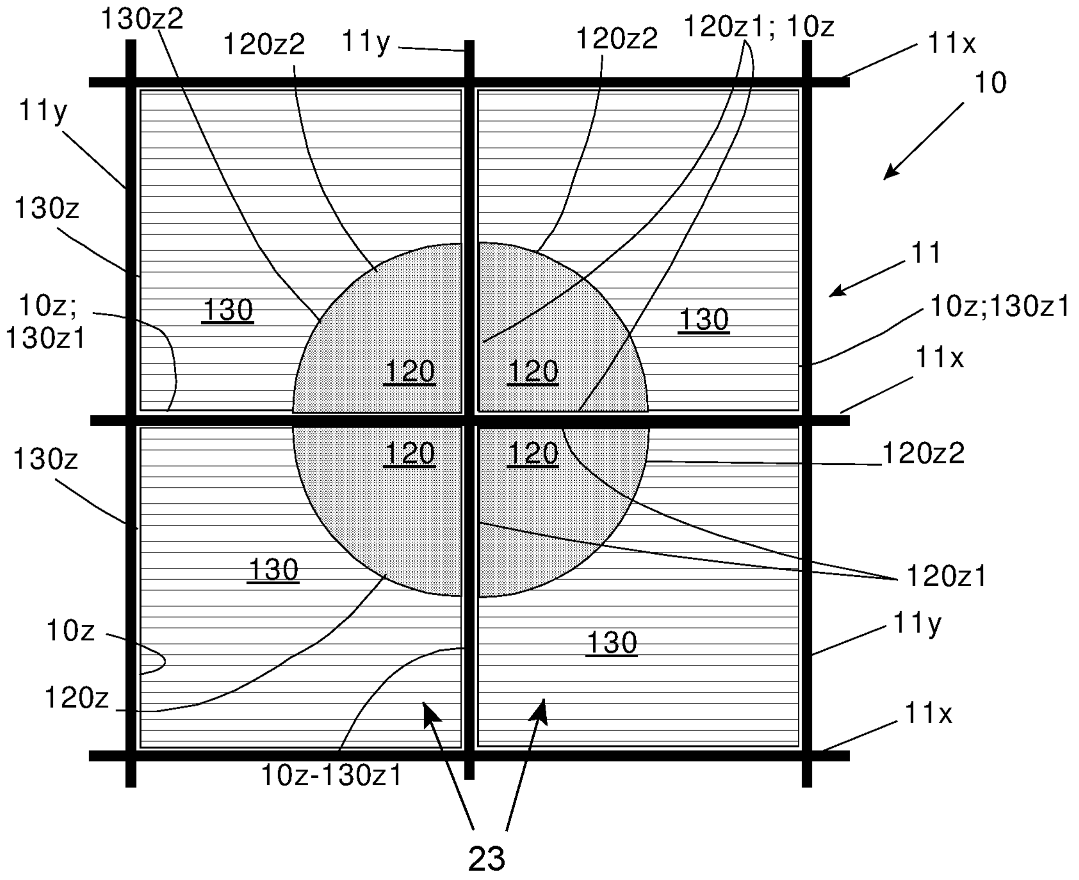

In the examples of FIGS. 3*a* and 3*c*, the remaining area of the T-bar grid cells is occupied and covered by a ceiling tile 130 having a periphery section 130*z*2 which is complementary to the second periphery section 120*z*2 of the tile light luminaire 120. Accordingly, the second periphery section 120*z*2 of the tile light luminaire 120 is structured to abut with the complementary periphery section 130*z*2 of the ceiling tile 130, thus effectively covering the T-bar grid cell. Likewise, the ceiling tile 130 has a complementary first periphery sections 130*z*1 for abutment with the inner periphery 10*z* of the T-bar grid cell.

Figure 3D:
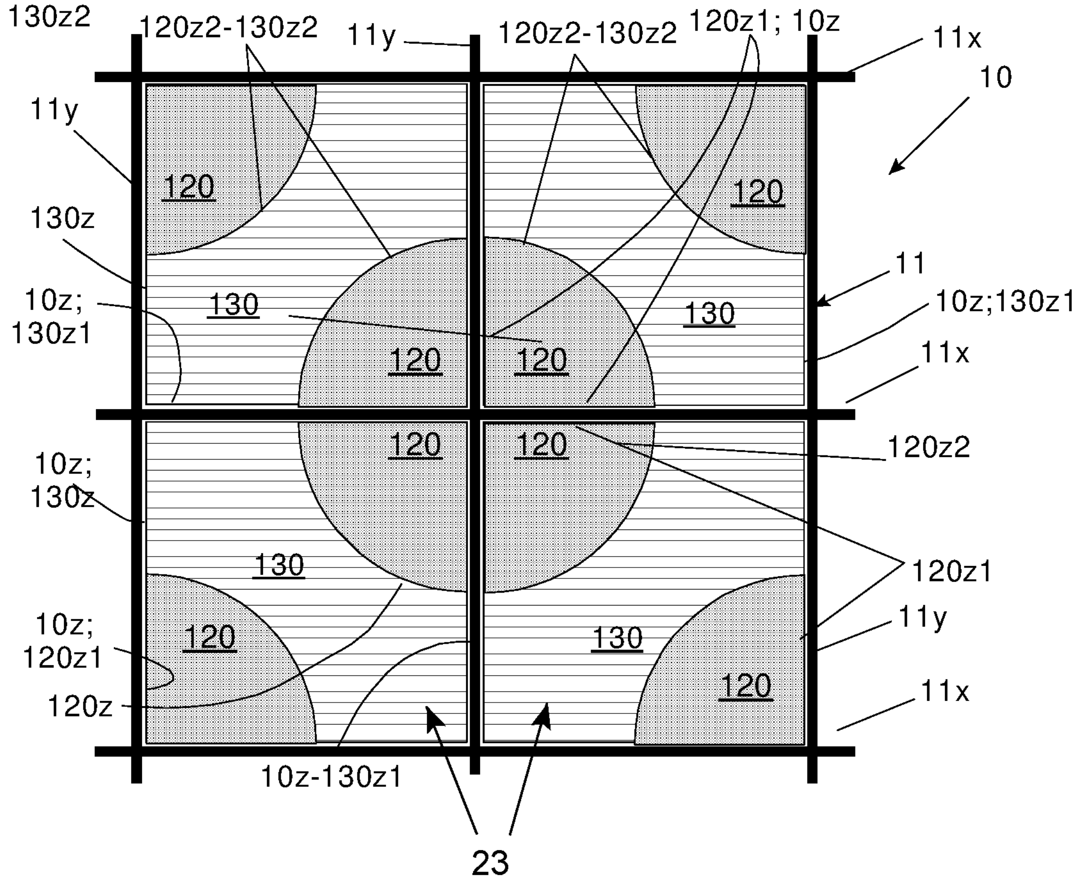

In the examples of FIGS. 3*b* and 3*d*, two tile light luminaires 120 are mounted at different locations (corners) in the same T-bar grid cell and accordingly the complementary ceiling tile 130 of these two examples has a second periphery section 130*z*2 structured to abut with the second periphery sections 120*z*2 of both tile light luminaires 120.

When several tile light luminaires 120 are intended to be mounted within the same T-bar grid cell, these tile light luminaires 120 can be identical or congruent to each other or can have different periphery configurations. When mounting multiple tile light luminaires 120 in the same T-bar grid cell, the remaining open surface area of the T-bar grid cell is to be occupied/covered by one or more corresponding ceiling tiles 130 having complementary first and second periphery sections 130*z*1-130*z*2 for abutment with either the inner periphery 10*z* of the T-bar grid cell and the tile light luminaires 120.

The inclined orientation between the straight periphery parts of the first periphery section 120*z*1 of the tile light luminaire 120 with respect to each other can be 90° or smaller, in particular 30°, 45°, 60° or 90°, all depending on the geometry of the T-bar grid cells of the suspended tile light ceiling assembly. Tile light luminaries 120 having such specific outer periphery designs of their luminaire housing 220, can be used complex and appealing lighting pattern design, which deviate significantly from the known straightforward square or rectangular designs.

Figure 3E:
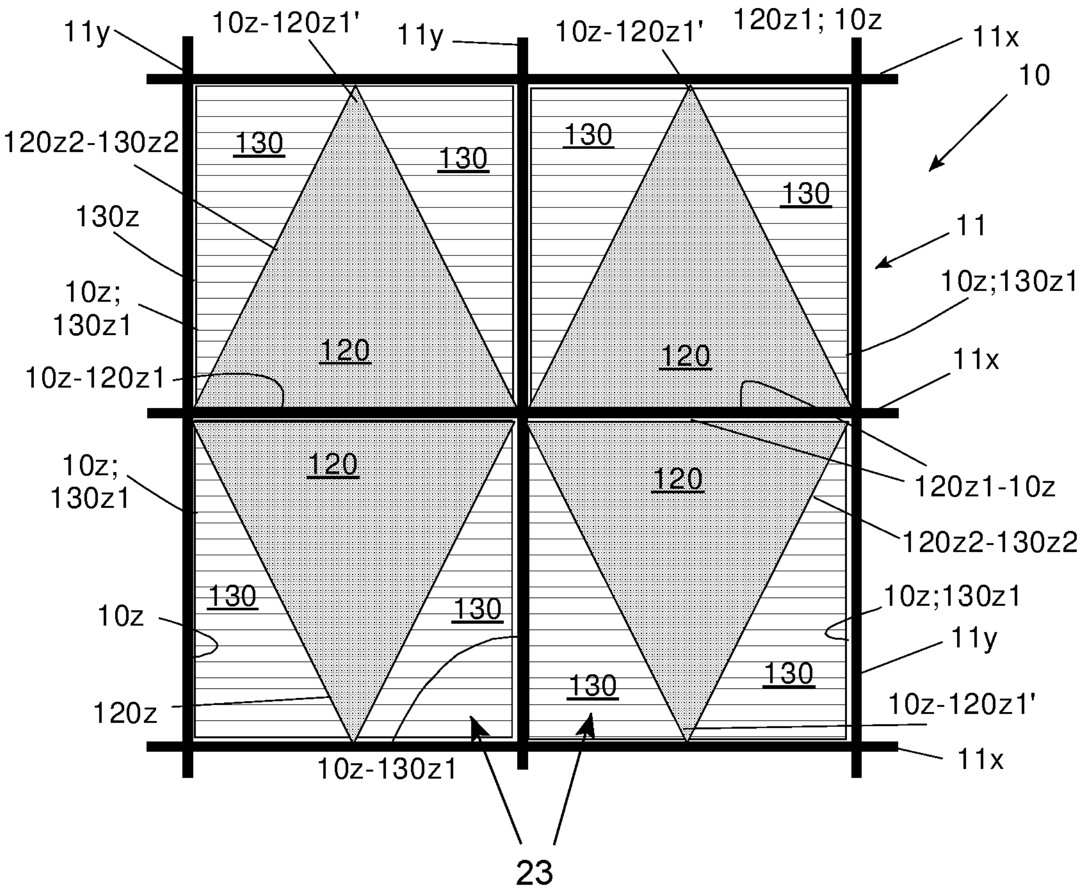

In addition, in the examples of FIGS. 3*e* and 3 *h*, the tile light luminaire 120 has a specific geometry, wherein the first periphery section 120*z*1 comprises at least one supporting point 120*z*1'. In FIG. 3*e*, said supporting point 120*z*1' is formed as the apex (vertex) of the equilateral rectangle shaped tile luminaire 120, of which both the apex (vertex) as its base edge form the first periphery section 120*z*1 for abutment with the inner periphery 10*z* of the T-bar grid cell. The second periphery section 120*z*2 of the triangle shaped tile luminaire 120 is composed of two separate straight periphery parts forming the two other vertices of the triangle.

Figure 3F:
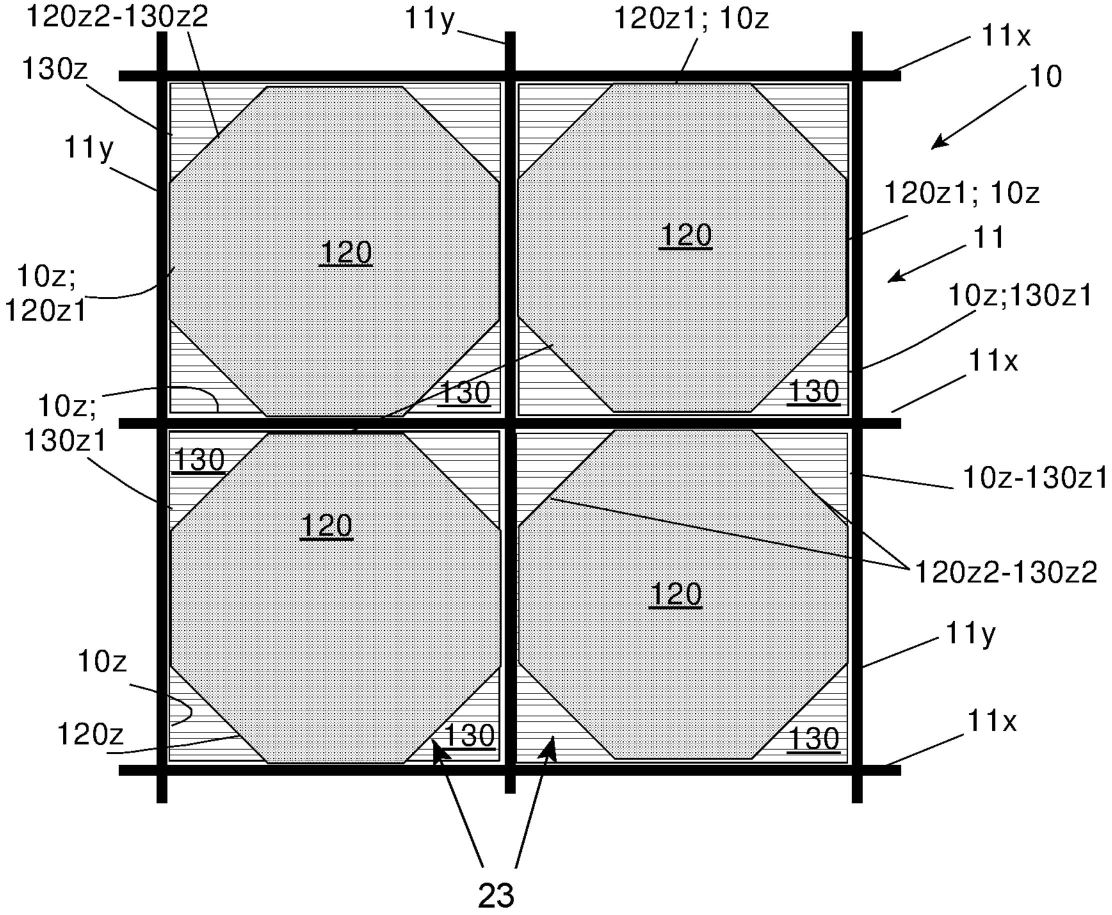

In general, it is noted that the tile luminaire 120 can have an outer periphery 120*z* formed as a regular polygon, with equiangular angles and equilateral sides. An example of such polygon configuration is depicted in FIG. 3*f*. In this example, Four complementary triangle shaped ceiling tiles 130 are used for abutment with their second periphery section 130*z*2 with the second periphery sections 120*z*2 of the polygon shaped tile luminaire 120 and with their first periphery sections 130*z*1 with (the corners of) the inner periphery 10*z* of the T-bar grid cell.

In FIG. 3*e*, the tile luminaire 120 has an outer periphery 120*z* formed as an equilateral rectangle. Furthermore, two complementary triangle shaped ceiling tiles 130 are used for abutment with their second periphery section 130*z*2 with the second periphery sections 120*z*2 of the equilateral rectangle shaped tile luminaire 120 and with their first periphery sections 130*z*1 with (the corners of) the inner periphery 10*z* of the T-bar grid cell.

Figure 3G:
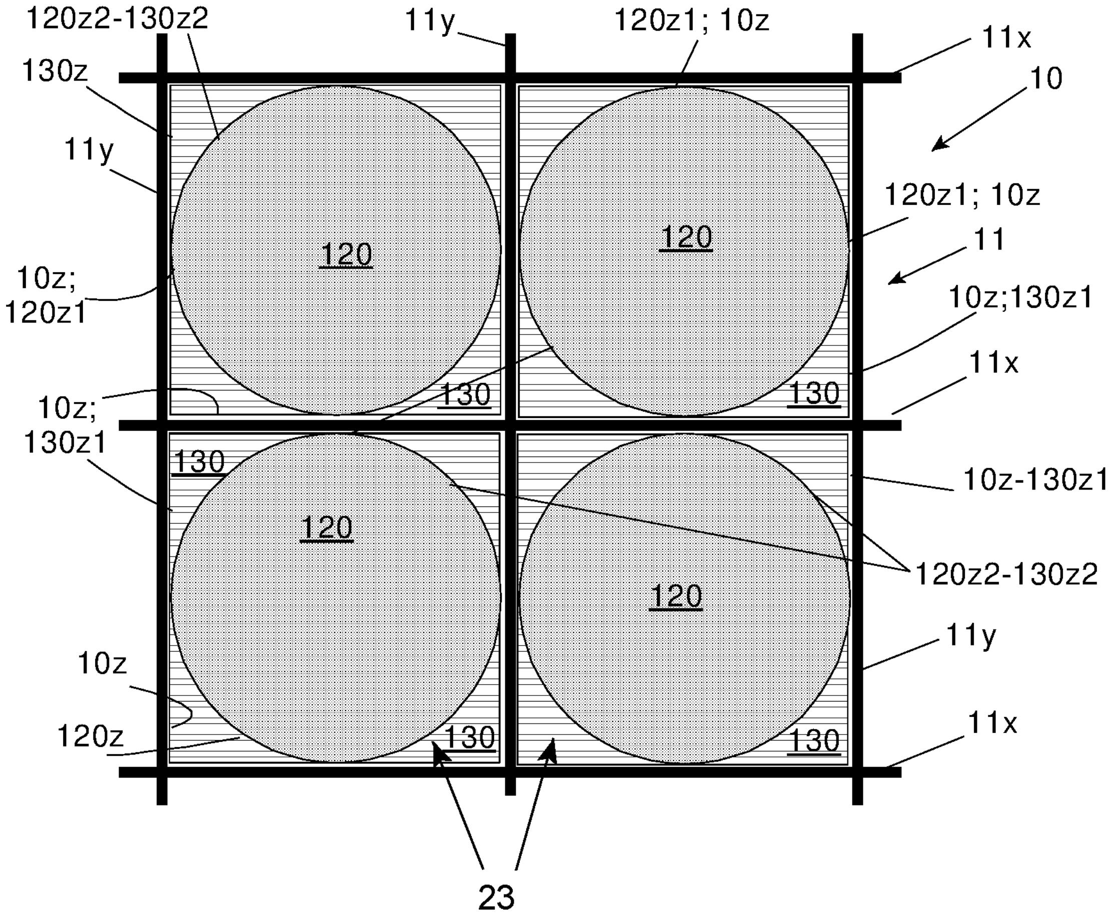
Figure 3H:
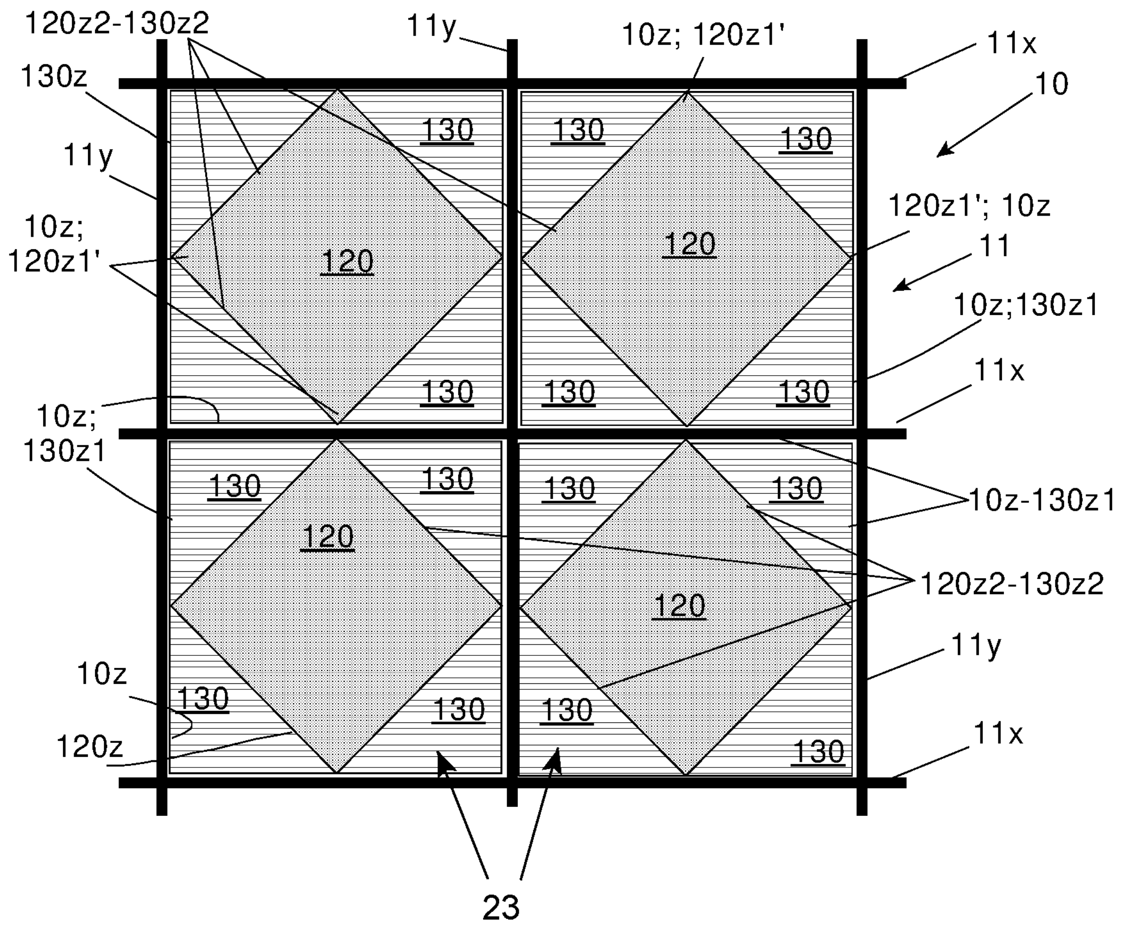

In the example of FIG. 3*h* the tile luminaire 120 has a square configuration and abuts with its four corners, functioning as contact points or vertexes 120*z*1' forming the first periphery section 120*z*1, against the inner periphery 10*z* of the T-bar grid cell. Four complementary triangle shaped ceiling tiles 130 are used for abutment with their second periphery section 130*z*2 with the second periphery sections 120*z*2 of the square tile luminaire 120 and with their first periphery sections 130*z*1 with (the corners of) the inner periphery 10*z* of the T-bar grid cell.

A rectangular configuration of the tile luminaire 120 is also a possible example, for mounting in a rectangular T-bar grid configuration.

A variant on the example of FIG. 3*h* is depicted in FIG. 3*g*, wherein the tile luminaire 120 has an outer periphery configuration shaped as a circle. The circle periphery 120*z* abuts with its four contact or tangent points 120*z*1 with the inner periphery 10*z* of the T-bar grid cell. Four complementary quarter circle shaped ceiling tiles 130 are used for abutment with their second periphery section 130*z*2 with the arc shaped second periphery sections 120*z*2 of the circle shaped tile luminaire 120 and with their first periphery sections 130*z*1 with (the corners of) the inner periphery 10*z* of the T-bar grid cell. Likewise the outer periphery configuration of the tile light luminaire 120 can be shaped as an ellipse.

Likewise, also the second periphery section 120*z*2 of the outer periphery 102*z* of the tile light luminaire 120 may comprise one or more (two) straight periphery parts, as depicted in FIGS. 3*a*-3*b*-3*e* and 3*f*. These straight periphery parts of the second periphery section 120*z*2 interact through abutment with corresponding complementary straight periphery parts of the second periphery section 130*z*2 of one or more corresponding ceiling tiles 130.

The second periphery section 120*z*2 may also comprises at least one curved periphery part, which curved periphery section can be a circle arc or elliptical periphery section. In particular examples, the at least one circle arc periphery section is a 90° or 180° circle arc. Examples of quarter circle (90°) examples are shown in FIGS. 3*c* and 3*d*. This allows for the creation of lighting ceiling surfaces having a variety of curved patterns.

Figure 4A:
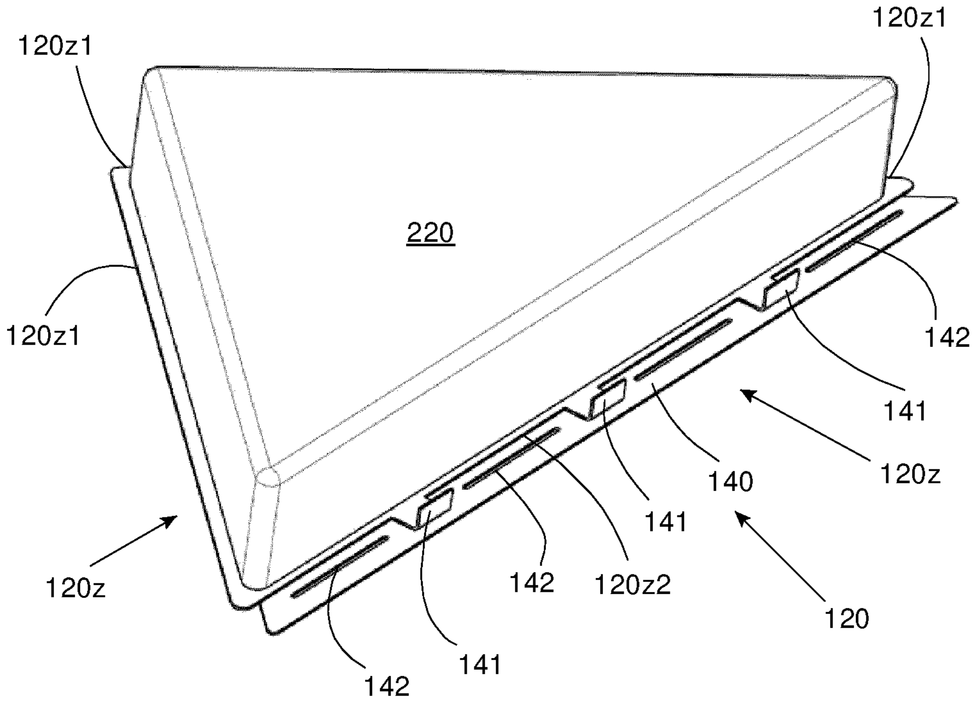
FIGS. 4*a* and 4*b* an example of a tile light luminaires according to the 15 disclosure.
Figure 4B:
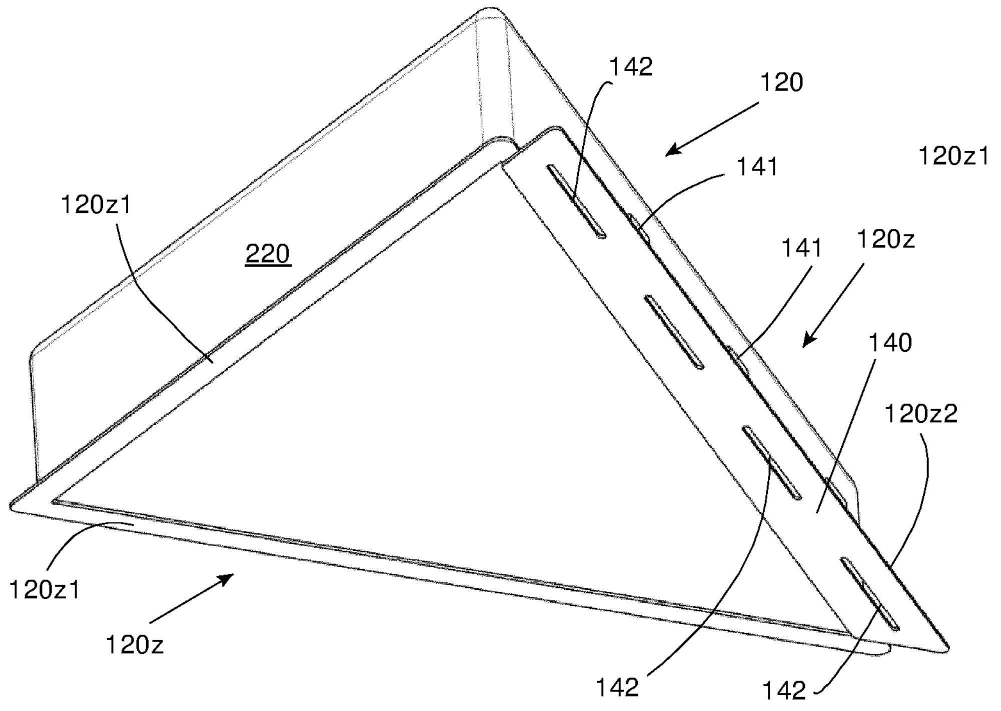
Figure 5A:
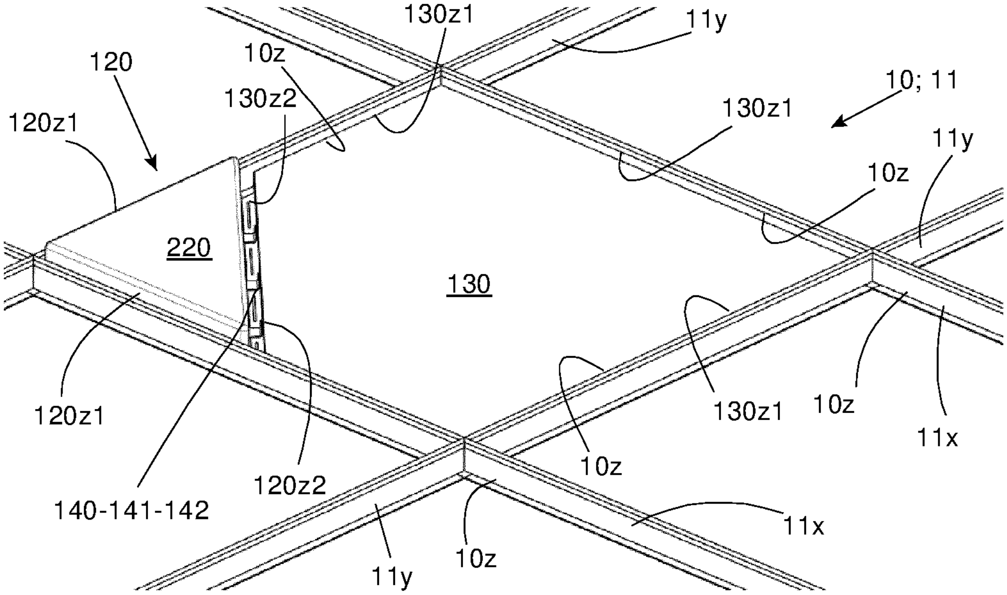
FIGS. 5*a* and 5*b* detailed views of a suspended ceiling assembly implementing a T-bar grid and tile light luminaires according to the disclosure.
Figure 5B:
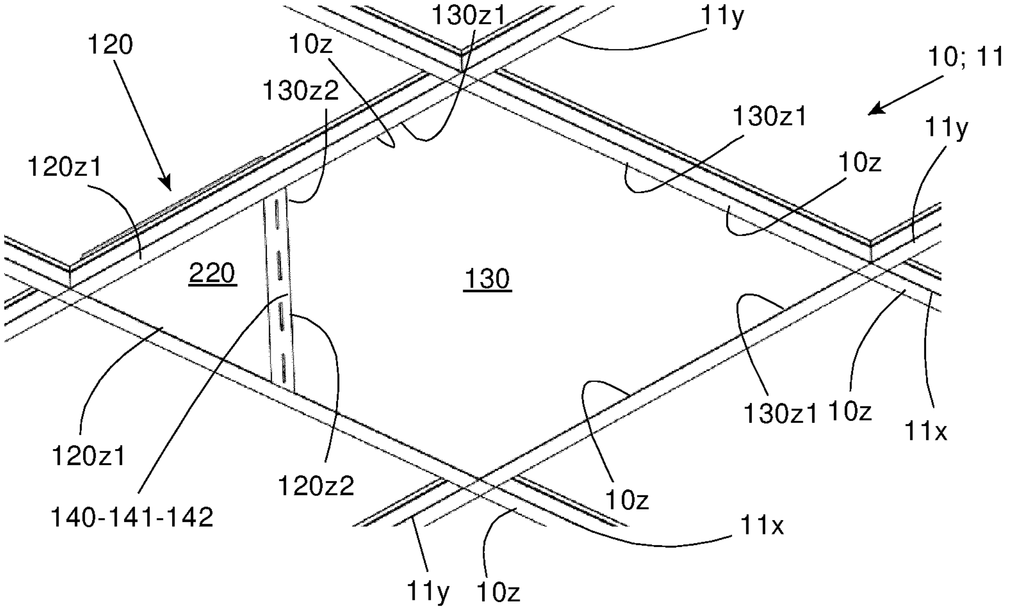

FIGS. 4*a* and 4*b* disclose in more detail an example of a tile light luminaire 120 according to the disclosure, whereas FIGS. 5*a* and 5*b* disclose such tile light luminaire 120 mounted or laid in a suspended tile light ceiling assembly 10-11 according to the disclosure. The tile light luminaire 120 according to the disclosure may have an irregular shape as shown in FIGS. 2 and 3*a*-3*h*. The tile light luminaire 120 comprises at least one light emitting source (not shown in the Figures) within the luminaire housing 220. The tile light luminaire 120 and in particular the luminaire housing 220 has an outer periphery 120*z* for interaction with both the inner periphery 10*z* of a T-bar grid cell and the outer periphery of a complementary ceiling tile 130.

For achieving a proper abutment with the complementary ceiling tile 130, the second periphery section 120*z*2 of the outer periphery 120*z* of the tile luminaire 120 is provided with a support rail 140. The support rail 140 is mounted to the tile luminaire 120 and preferable made from a rigid material, such as metal. The support rail 140 is structured to support the section part 130*z*2 of the periphery 130*z* of a ceiling tile 130, such that tile light surface and the ceiling tile surface are mutually flush.

In particular, the support rail 140 is provided with mounting pins 141 for interaction with the section part 130*z*2 of the periphery of a ceiling tile 130. The mounting pins 141 protrude from the support rail 140 and may function as rest stops for the section part 130*z*2 of the periphery 130*z* of a ceiling tile 130. This ensures a proper and reliable support for the ceiling tile 130 within the T-bar grid cell.

The mounting pins 141 furthermore create a small gap between the luminaire house 220 and the adjoining ceiling tile. Herewith it is possible to dissipate heat generated by the light emitting source of the tile luminaire 120 easily. In addition, the support rail 140 can be provided with venting openings 142, which allow ventilation of air across the suspended ceiling assembly 10 through the venting openings 142 and the gap between the luminaire house 220 and the adjoining ceiling tile.

In addition, the support rail 140 may be provided with one or more mounting openings, e.g. for mounting or accommodating one or more sensor elements (not shown), for example for detecting motion below the suspended ceiling assembly 10 in the room, to a humidity level of the air, or a light intensity level. Next to presence or movement detectors (usually PIR sensors), which switch off the light when no person is in the room, and daylight sensors, to dim the light in case there is sufficient daylight in the room, other sensors may be related to sound or camera-based (to detect presence, density of occupants, or even the type of activity in the room), or to the air quality in the room (humidity, or pollutants like carbon monoxide, carbon dioxide, nitrogen dioxide, ozone).

The mounting opening or a slot in the support rail 140 can also accommodate communication modules based on, for instance, RF communication, LiFi communication, or acoustic (ultrasound) communication, to enable wireless communication between the luminaires or between the luminaires and other communication modules in the room.

The sensor elements might generate electronic signals based on which the control circuitry of the suspended ceiling assembly 10 is controlled, e.g. for switching on or off the tile light luminaires. In another example, the sensor elements accommodated in the rail 140 may detect heat or smoke and subsequently activate a sprinkler system.

More complex lighting patterns of lighting ceiling surfaces having a variety of curved patterns can be established, as shown in the examples of FIGS. 6*a*-6*f*.

Figure 6:
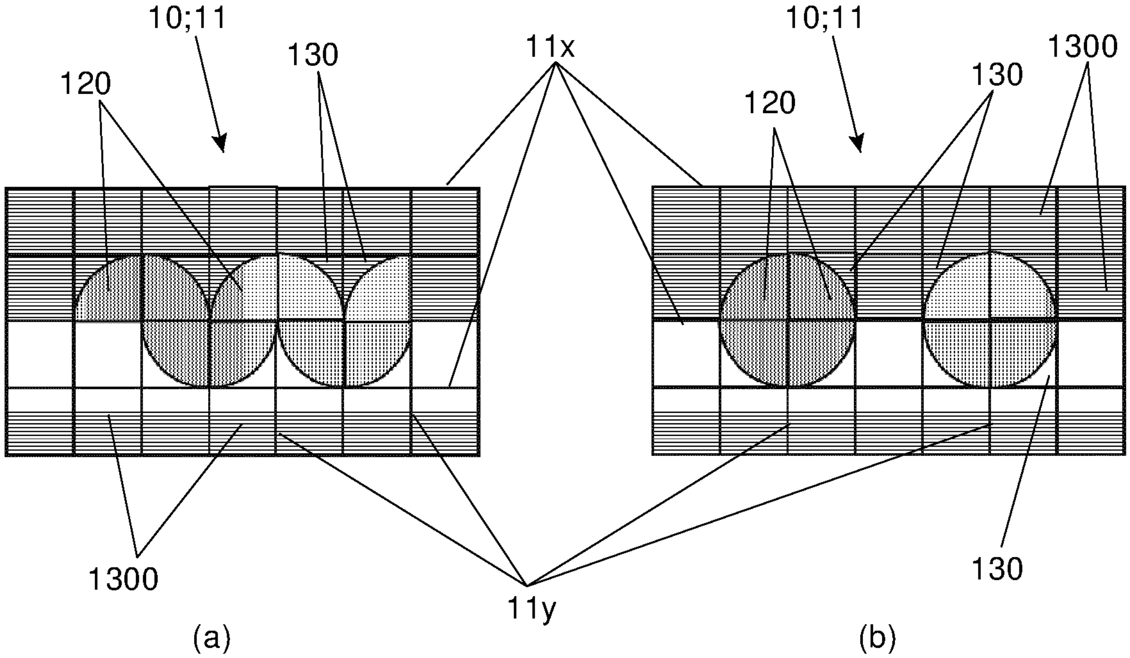
FIGS. 6*a*-6*f* further non-limiting examples of embodiments of a suspended ceiling assembly implementing a T-bar grid and tile light luminaires according to the disclosure.
Figure 6:
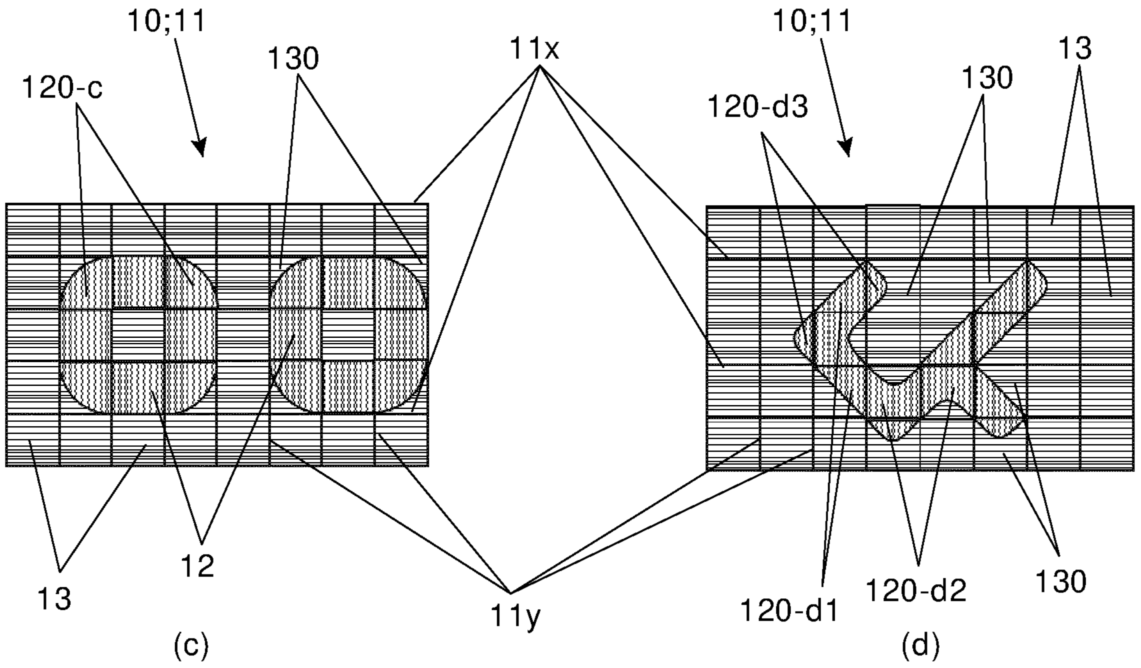
Figure 6:
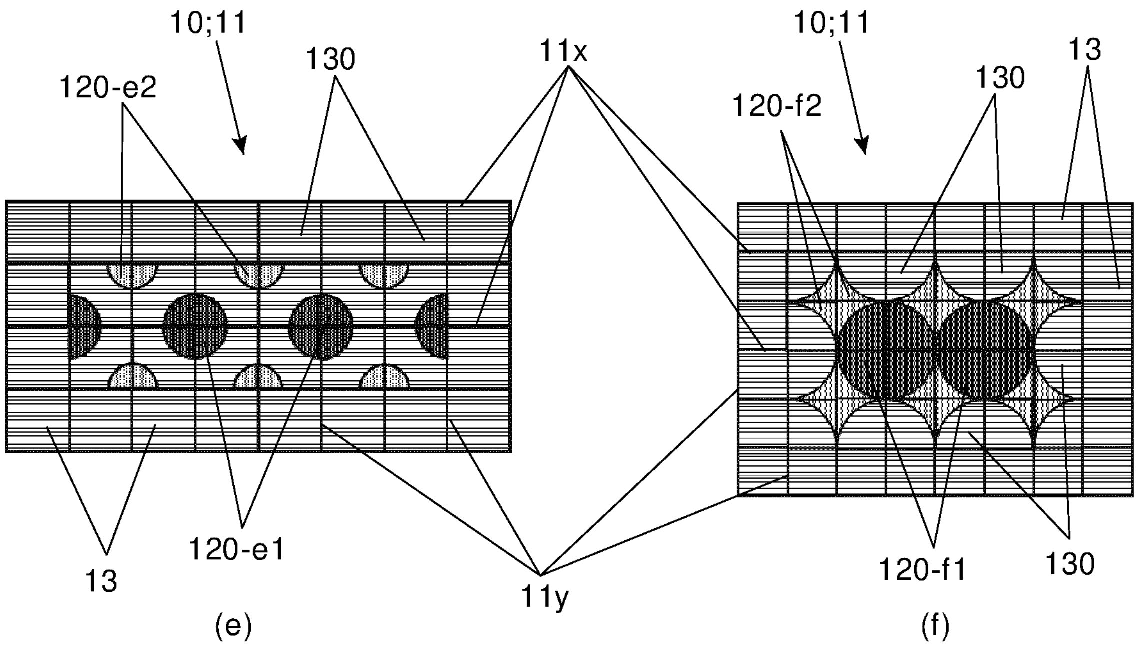

The suspended tile light ceiling assembly 10-11 of both FIG. 6*a* and FIG. 6*b* implements, next to standard known ceiling tiles 13, which cover a T-bar grid cell surface area completely, also quarter circle tile light luminaires 120 as outlined in FIG. 3*c* together with a complementary shaped ceiling tile 130.

The suspended tile light ceiling assembly 10-11 of FIG. 6*c* implements, next to standard known tile luminaries 12 and standard known ceiling tiles 13, which both cover a T-bar grid cell surface area completely, also quarter circle tile light luminaires 120 as outlined in FIG. 3*c* together with a complementary shaped ceiling tile 130.

The suspended tile light ceiling assembly 10-11 of FIG. 6*d* implements, next to standard known ceiling tiles 13, which cover a T-bar grid cell completely, also different groups of tile light luminaires 120. A first group consists of a plurality of rectangular shaped tile light luminaires 120-*d*1 as outlined in FIG. 3*a*-3*b*. The suspended tile light ceiling assembly 10-11 also comprises two further groups of differently curved tile light luminaires 120-*d*2 and 120-*d*3. Likewise, complementary shaped ceiling tiles 130 for each group of tile light luminaires 120-*d*1; 120-*d*2; 120-*d*3 are used to cover the corresponding T-bar grid cells.

The suspended tile light ceiling assembly 10-11 of FIG. 6*e* implements, next to standard known ceiling tiles 13, which cover a T-bar grid cell completely, also two groups of quarter circle tile light luminaires 120-*e*1 and 120-*e*2 as outlined in FIG. 3*d* together with a complementary shaped ceiling tile 130 as shown in FIG. 3*d*. In this example, the two groups of tile light luminaires 120-*e*1 and 120-*e*2 have the same quarter circle outer periphery dimension 120*z*.

The suspended tile light ceiling assembly 10-11 of FIG. 6*f* implements, next to standard known ceiling tiles 13, which cover a T-bar grid cell completely, also two groups of quarter circle tile light luminaires 120-*f*1 and 120-*f*2 having the different curved outer periphery dimensions 120*z*. Also in this example, complementary shaped ceiling tiles 130 for each group of tile light luminaires 120-*f*1 and 120-*f*2 are used to cover the corresponding T-bar grid cells.

The examples of FIGS. 6*e* and 6*f* implement different groups of tile light luminaires 120-*e*1; 120-*e*2; 120-*e*3; 120-*f*1; 120-*f*2 having different outer periphery configurations, allowing the creation of a variety of curved patterns. In addition, the different groups of tile light luminaires may be structured to emit light having a dominant peak wavelength, which dominant peak wavelength differ from the dominant peak wavelength of each other group.

With this example, the light emitted by the tile light luminaires of the different groups can have different properties. In particular, the emitted light spectrum can differ per tile light luminaire group mounted in the suspended tile light ceiling assembly 10-11.

For example, referring to FIGS. 6*e* and 6*f*, the first tile light luminaire 120-*e*1 (120-*f*1) or the first group of tile light luminaires 120-*e*1 (120-*f*1) can emit a spectrum that provides functional light, such as visible light optimized for office work, whereas the other tile light luminaire 120-*e*2 (120-*f*2) or the further group of tile light luminaires 120-*e*2 (120-*f*2) emits light having a biological effect (such as a melanopic effect or for disinfection using UV light).

In another example, one first group of tile light luminaires 120-*e*1 (120-*f*1) may emit functional white light, whereas another further group of tile light luminaires 120-*e*2 (120-*f*2) could emit a lower intensity colored light pattern for a decorative purpose. Additional functional or aesthetic effects can be achieved with the use of a further, third or even fourth, group of tile light luminaires emitting light with a different dominant peak wavelength, either in the visible or invisible wavelength range.

Figure 7:
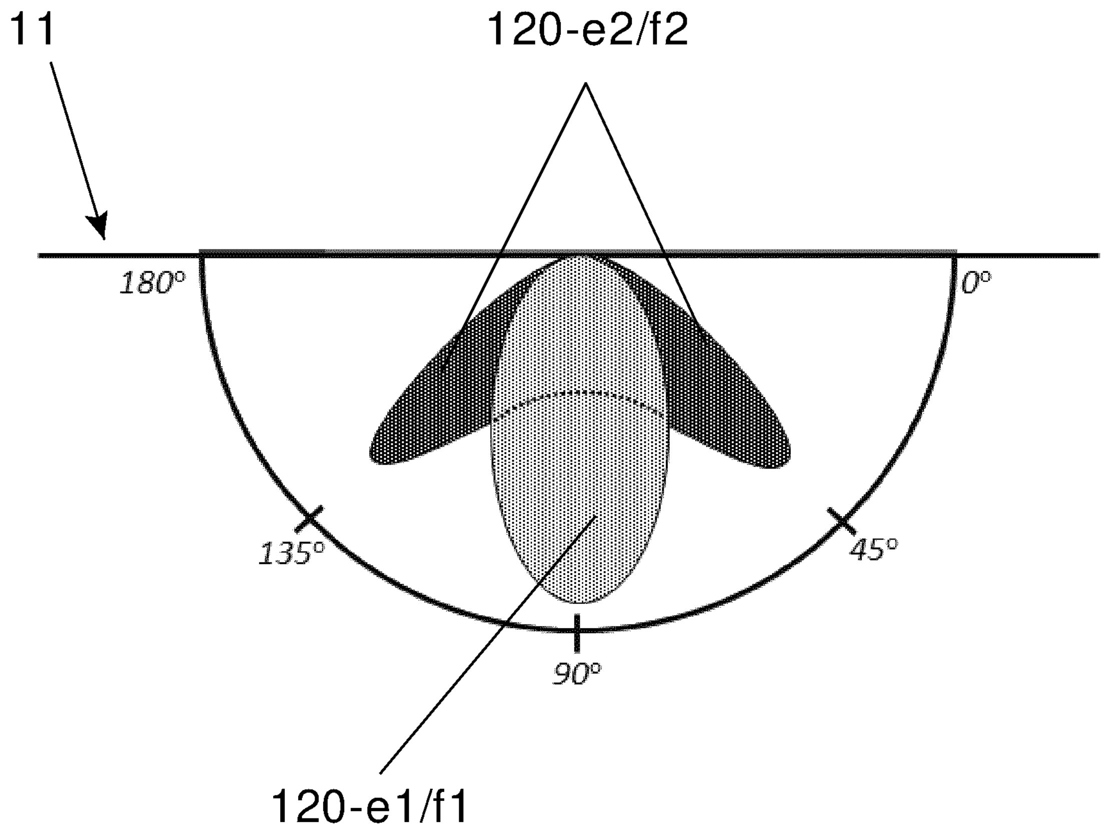
FIG. 7 a further example of a suspended ceiling assembly according to the disclosure.

In a further advantageous example of the disclosure as depicted in FIG. 7, the first 120-*e*1 (120-*f*1) and further 120-*e*2 (120-*f*2) group of tile light luminaires emit light in different angular directions relative to the orientation of the T-bar ceiling grid 11. For example, the first tile light luminaire 120-*e*1 (120-*f*1) or the first group of tile light luminaires 120-*e*1 (120-*f*1) can emit a spectrum that provides functional light, such as visible light optimized for office work, can directed predominantly downwards at an angle of 90° relative to the T-bar ceiling grid 11. The further tile light luminaire 120-*e*2 (120-*f*2) or the further group of tile light luminaires 120-*e*2 (120-*f*2) can emit visible light with a different dominant peak wavelength or light providing a biological or aesthetical effect predominantly at angles (e.g. 45° and) 135° deviating substantially from a normal to the grid ceiling 11.

Each tile luminaire 120 may have its own power supply and driving circuitry. Alternatively, power (and data) supply between the tile luminaire can be shared, e.g. each group of light luminaires 120-*e*1 (120-*f*1) and 120-*e*2 (120-*f*2) can have one group dedicated power supply and driving circuitry. In another example, tile luminaires with a small light emitting window 222 may receive power from a neighboring tile luminaire with a larger light emitting window 222.

In all examples shown in the Figures, the tile light luminaire 120 comprising at least one light emitting source (not shown in the Figures) within the luminaire housing 220. The at least one light emitting source is structured to emit light having a dominant peak wavelength. In addition, the luminaire housing 220 is provided with a light exit window 221 for the light being emitted. An example of such tile light luminaire 120 is depicted in more detail in FIG. 8*a*. The light emitting source can be a LED light device.

Figure 8:
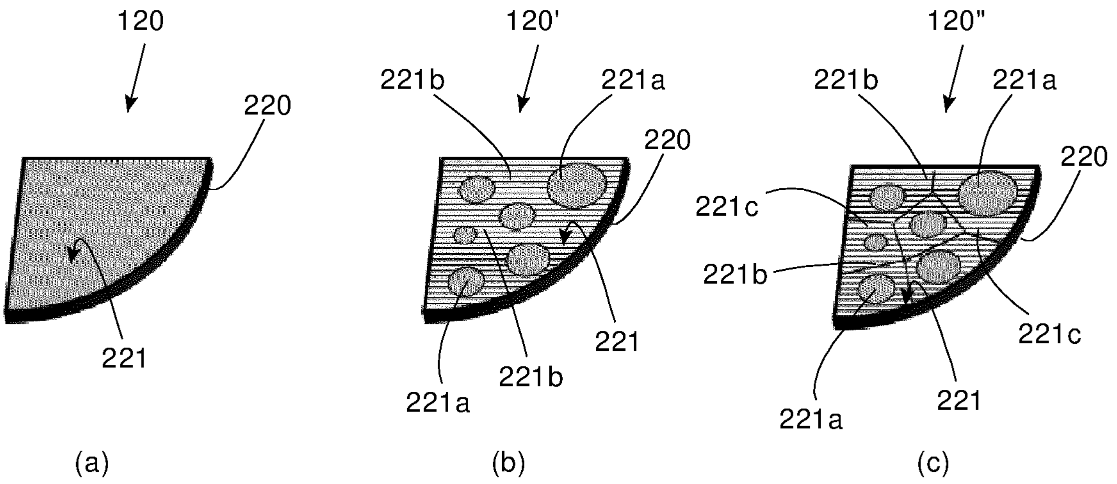
FIGS. 8*a*-8*c* further non-limiting examples of a tile light luminaires according to the disclosure.

In further example shown in FIGS. 8*b* and 8*c*, the light exit window 221 is provided with window parts 221*a*, which allow translucent to the light being emitted and windows parts 221*b* which are opaque to the light being emitted. Herewith an additional design feature is created, which allows for designing other lighting patterns across the suspended ceiling surface with a sophisticated surface illumination. The opaque/non-light-emitting window parts 221*b* may be made of an opaque plastic component material or from same sound-proofing material, such as compacted mineral fibers, as used for regular non-light-emitting tiles 13 of FIG. 1*a*.

Alternatively, as shown in FIG. 8*c*, the light exit window 221 can be subdivided into window part areas 221*c* that differ in shape (e.g., Voronoi polyhedra) and wherein each windows part area 22*c* may provide a beam of downwards directed light.

In all examples shown in the Figures, the shape at the outer edge of each tile light luminaire 120 as well as the complementary shaped non-light-emitting ceiling tile 130 and regular non-light-emitting tile 13 is such, that the surface transition between every pair of neighboring tiles is flush. This means that between neighboring tiles no discontinuities in the surface occurs, and that in the event of neighboring tile light luminaires the neighboring light exit windows are flush, such that the properties of the emitted light across the surface transition are identical.

The invention claimed is:

1. A combination of at least a tile light luminaire and a ceiling tile, said combination being configured for laying/being mounted into a T-bar grid cell of a T-bar grid of a suspended ceiling assembly available in standard dimensions, said combination comprising:

the tile light luminaire comprising a luminaire housing with an outer housing periphery, the whole outer housing periphery being smaller than and supported by the inner periphery of the T-bar grid cell, wherein a first periphery section of the housing periphery of the tile light luminaire is structured for abutment with a section part of the periphery of the T-bar grid cell, and a second periphery section of the housing periphery of the tile light luminaire is structured for abutment with a section part of the periphery of a ceiling tile, wherein the periphery of the ceiling tile having a section part being complementary to a section part of the periphery of a tile light luminaire, wherein the tile light luminaire has a tile light surface and the ceiling tile has a ceiling tile surface, in mounted configuration of said combination a cell surface area of the T-bar grid cell is essentially completely covered by said combination, wherein the second periphery section is provided with a support rail structured to support the section part of the periphery of a ceiling tile, wherein the support rail is provided with at least one vent opening, wherein the support rail is provided with mounting pins for interaction with the section part of the periphery of a ceiling tile, and wherein the mounting pins are fixedly attached to the support rail in a manner that creates a gap between the luminaire housing and said section part of the periphery of the ceiling tile, thereby permitting dissipation of heat generated within the luminaire housing thorough said gap and said vent opening.

2. The combination according to claim 1, wherein the first periphery section comprises at least one straight periphery part.

3. The combination according to claim 1, wherein the first periphery section comprises at least two straight periphery parts.

4. The combination according to claim 1, wherein the first periphery section comprises at least one supporting point.

5. The combination according to claim 1, wherein the second periphery section comprises at least one straight periphery part.

6. The combination according to claim 1, wherein the second periphery section comprises at least one curved periphery part.

7. The combination according to claim 3, wherein the at least two straight periphery parts of the periphery section are inclined with respect to each other.

8. The combination according to claim 1, wherein support rail supports the section part of the periphery of a ceiling tile such that tile light surface and the ceiling tile surface are mutually flush.

9. The combination according to claim 1, wherein the support rail is provided with venting openings.

10. The combination according to claim 1, wherein the support rail is provided with one or more mounting openings for mounting one or more sensor elements.

11. The combination according to claim 1, further comprising at least one light emitting source within the luminaire housing and configured to emit device light having a dominant peak wavelength within a visible light wavelength range and wherein the luminaire housing is provided with a light exit window for the light being emitted.

12. A suspended tile light ceiling assembly implementing a T-bar grid and a plurality of combinations of tile light luminaire and ceiling tile suitable for laying in the T-bar grid according to claim 1.

13. The suspended tile light ceiling assembly according to claim 12, wherein the plurality of tile light luminaires is composed of a first group of tile light luminaires configured to emit device light having a first dominant peak wavelength and at least one further group of tile light luminaires configured to emit device light having a further dominant peak wavelength, the further dominant peak wavelength being different from the first dominant peak wavelength.

* * * * *